(12) United States Patent
Wang

(10) Patent No.: US 11,768,373 B2
(45) Date of Patent: Sep. 26, 2023

(54) VR GLASSES

(71) Applicant: QINGDAO PICO TECHNOLOGY CO., LTD., Shandong (CN)

(72) Inventor: Zishang Wang, Shandong (CN)

(73) Assignee: QINGDAO PICO TECHNOLOGY CO., LTD., Shandong Province (CN)

( * ) Notice: Subject to any disclaimer, the term of this patent is extended or adjusted under 35 U.S.C. 154(b) by 0 days.

(21) Appl. No.: 17/881,558

(22) Filed: Aug. 4, 2022

(65) Prior Publication Data

US 2022/0373799 A1    Nov. 24, 2022

Related U.S. Application Data

(63) Continuation of application No. PCT/CN2021/116754, filed on Sep. 6, 2021.

(30) Foreign Application Priority Data

Dec. 29, 2020  (CN) .......................... 202011601490.2

(51) Int. Cl.
| | | |
|---|---|---|
| *G02B 27/01* | (2006.01) | |
| *G02B 27/00* | (2006.01) | |
| *A61B 3/02* | (2006.01) | |

(52) U.S. Cl.
CPC ..... *G02B 27/0149* (2013.01); *G02B 27/0101* (2013.01); *G02B 27/0172* (2013.01);
(Continued)

(58) Field of Classification Search
USPC ............... 359/629–636, 13–14, 618; 349/11; 310/49 R, 156.32–156.35, 266–268, 310/156.02; 345/7, 9, 632–633, 207; 351/200, 206, 205; 340/438, 980, 995.1, 340/815.47, 815.74; 348/113–120
See application file for complete search history.

(56) References Cited

U.S. PATENT DOCUMENTS

| | | | | |
|---|---|---|---|---|
| 2016/0320612 A1* | 11/2016 | Zhang | ................. | G02B 27/017 |
| 2018/0338130 A1* | 11/2018 | Miller | ................. | H04N 13/327 |
| 2019/0285894 A1* | 9/2019 | Tian | ................. | G02B 27/0172 |

FOREIGN PATENT DOCUMENTS

| | | | |
|---|---|---|---|
| CN | 104914579 A | | 9/2015 |
| CN | 105425397 A | * | 3/2016 |

(Continued)

*Primary Examiner* — Dawayne Pinkney

(57) ABSTRACT

Disclosed in the present disclosure is a VR glasses which includes: a screen frame and a bottom plate, wherein the screen frame is fixed to the bottom plate, the bottom plate is provided with two light-transmitting holes symmetrically, and an edge of the screen frame has a first side structure perpendicular to the bottom plate; a first lens barrel and a second lens barrel, wherein the first lens barrel and the second lens barrel communicate with the two light-transmitting holes and each of the first lens barrel and the second lens barrel is provided with a lens; and a transmission mechanism, wherein the transmission mechanism is a stepped adjustment mechanism, the transmission mechanism is arranged close to the first side structure of the screen frame, the first lens barrel and the second lens barrel is configured to move toward each other through the transmission mechanism.

15 Claims, 6 Drawing Sheets

(52) U.S. Cl.
CPC .. *G02B 27/0176* (2013.01); *G02B 2027/0132* (2013.01); *G02B 2027/0154* (2013.01); *G02B 2027/0178* (2013.01)

(56) References Cited

FOREIGN PATENT DOCUMENTS

| | | | |
|---|---|---|---|
| CN | 205427326 U | | 8/2016 |
| CN | 205845803 U | | 12/2016 |
| CN | 106501941 A | | 3/2017 |
| CN | 106597666 A | | 4/2017 |
| CN | 206292456 U | * | 6/2017 |
| CN | 206788464 U | | 12/2017 |
| CN | 108563021 A | | 9/2018 |
| CN | 110579878 A | | 12/2019 |
| CN | 111929903 A | | 11/2020 |
| CN | 112630972 A | | 4/2021 |
| CN | 214041888 U | | 8/2021 |

* cited by examiner

VR GLASSES

The present disclosure is a continuation application of International Patent Application No. PCT/CN2021/116754, which is filed on Sep. 6, 2021 and claims the priority of a patent application No. 202011601490.2 filed to the China National Intellectual Property on Dec. 29, 2020, entitled "VR Glasses".

TECHNICAL FIELD

The present disclosure belongs to the field of virtual reality technology. Specifically, this disclosure relates to a VR glasses.

BACKGROUND

VR (Virtual Reality) glasses use head-mounted display devices to close people's vision and hearing from the outside world, and guide users to feel like they are in a virtual environment. The display principle of the VR glasses is that left and right eye screens respectively display the images of the left and right eyes, and a three-dimensional effect is generated in minds after human eyes obtain this information with differences.

When using the VR glasses, in order to ensure more comfortable experience and viewing effect, users need to adjust the distance between the two lens barrels of the VR glasses according to their interpupillary distances. However, in the prior art, the distance between the two lens barrels is usually changed by a stepless adjustment. The distance between the two lens barrels, during use, is easy to change, and after adjusting the distance between the lens barrels many times, it is easy to damage seal between the lens barrels and a base. Therefore, sealing effect is low, and at the same time dust easily enters into the lens barrels, resulting in a reduction in the clarity of the VR glasses.

Therefore, it is necessary to improve the structure of the VR glasses to solve the problem that the adjustment method of the distance between the two lens barrels of the VR glasses is not conducive to daily use.

SUMMARY

Some embodiments of this disclosure provide a VR glasses to solve the problem that an adjustment method of the distance between the two lens barrels of the VR glasses is not conducive to daily use.

Some embodiments of the disclosure propose a VR glasses, includes:

a screen frame and a bottom plate, wherein the screen frame is fixed on the bottom plate, the bottom plate is provided with two light-transmitting holes symmetrically, and an edge of the screen frame has a first side structure perpendicular to the bottom plate;

a first sealing portion and a second sealing portion, wherein the first sealing portion and the second sealing portion are both made of a silicone material and correspond to the positions of the two light-transmitting holes respectively, the first sealing portion and the second sealing portion are both arranged on a same side as an extension direction of the first side;

a first lens barrel and a second lens barrel, wherein the first lens barrel communicates with one of the two light-transmitting holes through the first sealing portion and the second lens barrel communicates with the other one of the light-transmitting holes through the two second sealing portion, and each of the first lens barrel and the second lens barrel is provided with a lens;

a transmission mechanism, wherein the transmission mechanism is a stepped adjustment mechanism, the transmission mechanism is arranged close to the first side structure of the screen frame, the first lens barrel and the second lens barrel is configured to move toward each other through the transmission mechanism.

In some embodiments, the transmission mechanism includes a first gear, a fixing shaft, a gear bracket, and a spring, the fixing shaft is vertically fixed on the bottom plate, and the spring is in a compressed state and sleeved on the fixing shaft, the gear bracket is fixedly arranged on the fixing shaft in a horizontal direction, the first gear is rotatably arranged on the fixing shaft, and on a side of the first gear facing the gear bracket is a first mating surface, and on a side of the gear bracket facing the first gear is a second mating surface, the first mating surface and the second mating surface are pressed against each other by the spring, and there are matching face gears on the first mating surface and the second mating surface;

a first rack is provided on a side, close to the first side, of the first lens barrel, a second rack is provided on a side, close to the first side, of the second lens barrel, and the first gear is arranged between the first rack and the second rack; when the first gear is in a rotating state, the two face gears on the first mating surface and the second mating surface mesh with each other; the first rack and the second rack are configured to be able to drive the first lens barrel and the second lens barrel to approach or move away from each other.

In some embodiments, the VR glasses includes a first sliding rod provided on the first side, and the first lens barrel and the second lens barrel are slidably arranged on the first sliding rod.

In some embodiments, a first mounting portion is provided on a side of the first lens barrel facing the first side, and the first rack is arranged on the first mounting portion, a second mounting portion is provided on a side, facing the first side, of the second lens barrel, the second rack is arranged on the second mounting portion, the first mounting portion and the second mounting portion both extend horizontally to the first side structure and then bend toward a direction of the bottom plate, and the first sliding rod penetrates ends of the first mounting portion and the second mounting portion close to the bottom plate.

In some embodiments, a side of the screen frame opposite to the first side structure is a second side structure, a third mounting portion is disposed on a side, facing the second side, of the first lens barrel, a fourth mounting portion is disposed on a side, facing the second side, of the second lens barrel, the third mounting portion and the fourth mounting portion both extend horizontally to the second side and then bend toward a direction of the bottom plate, a second sliding rod is fixed on the second side at a position corresponding to the third mounting portion, the second sliding rod penetrates a bottom of the third mounting portion, a third sliding rod is fixed on the second side at a position corresponding to the fourth mounting portion, and the third sliding rod penetrates a bottom of the fourth mounting portion.

In some embodiments, each of middle parts of the first sealing portion and the second sealing portion protrudes away from a peripheral side and is in a shape of a lantern; when a distance between the first lens barrel and the second lens barrel is changed, the first sealing portion and the second sealing portion are both deformed.

In some embodiments, a first dust-proof sheet is provided on a position, corresponding to the first sealing portion, of the screen frame, and a second dust-proof sheet is provided on a position, corresponding to the second sealing portion, of the screen frame.

In some embodiments, a first mounting plate is formed by extending a side of the first lens barrel being connected with the first sealing portion, to a peripheral side; the first sealing portion is provided with a first mounting groove, and the first mounting plate is embedded in the first mounting groove;

a second mounting plate is formed by extending a side of the second lens barrel being connected with the second sealing portion, to the peripheral side; the second sealing portion is provided with a second mounting groove, and the second mounting plate is embedded in the second mounting groove.

In some embodiments, two fixing posts are provided on the bottom plate, the two fixing posts are respectively provided on two sides of the fixing shaft, both ends of the gear bracket are provided with through holes, and the two fixing posts penetrates into the through holes correspondingly.

In some embodiments, a broken portion is provided on the second side, and the broken portion corresponds to a center line of the first lens barrel and the second lens barrel.

In some embodiments, a limit plate is provided perpendicular to the bottom plate and around a peripheral side of the two light-transmitting holes, the first dust-proof sheet and the second dust-proof sheet are arranged on the limit plate, portions of the limit plate between the first lens barrel and the second lens barrel are close to each other.

In some embodiments of this disclosure, an adjustment of the distance between the two lens barrels of the VR glasses is changed into a stepped adjustment through the transmission mechanism, so that the adjustment of the distance between the two lens barrels becomes more controllable, after which the distance is not easy to change during the using process of the VR glasses, improving the user experience.

Through the following detailed description of exemplary embodiments of the present disclosure with reference to the accompanying drawings, other features and advantages of the present disclosure will become clear.

BRIEF DESCRIPTION OF THE DRAWINGS

The drawings incorporated in the specification and constituting a part of the specification illustrate the embodiments of the present disclosure, and together with the description are used to explain the principle of the present disclosure.

REFERENCE NUMERALS

Figure 1:
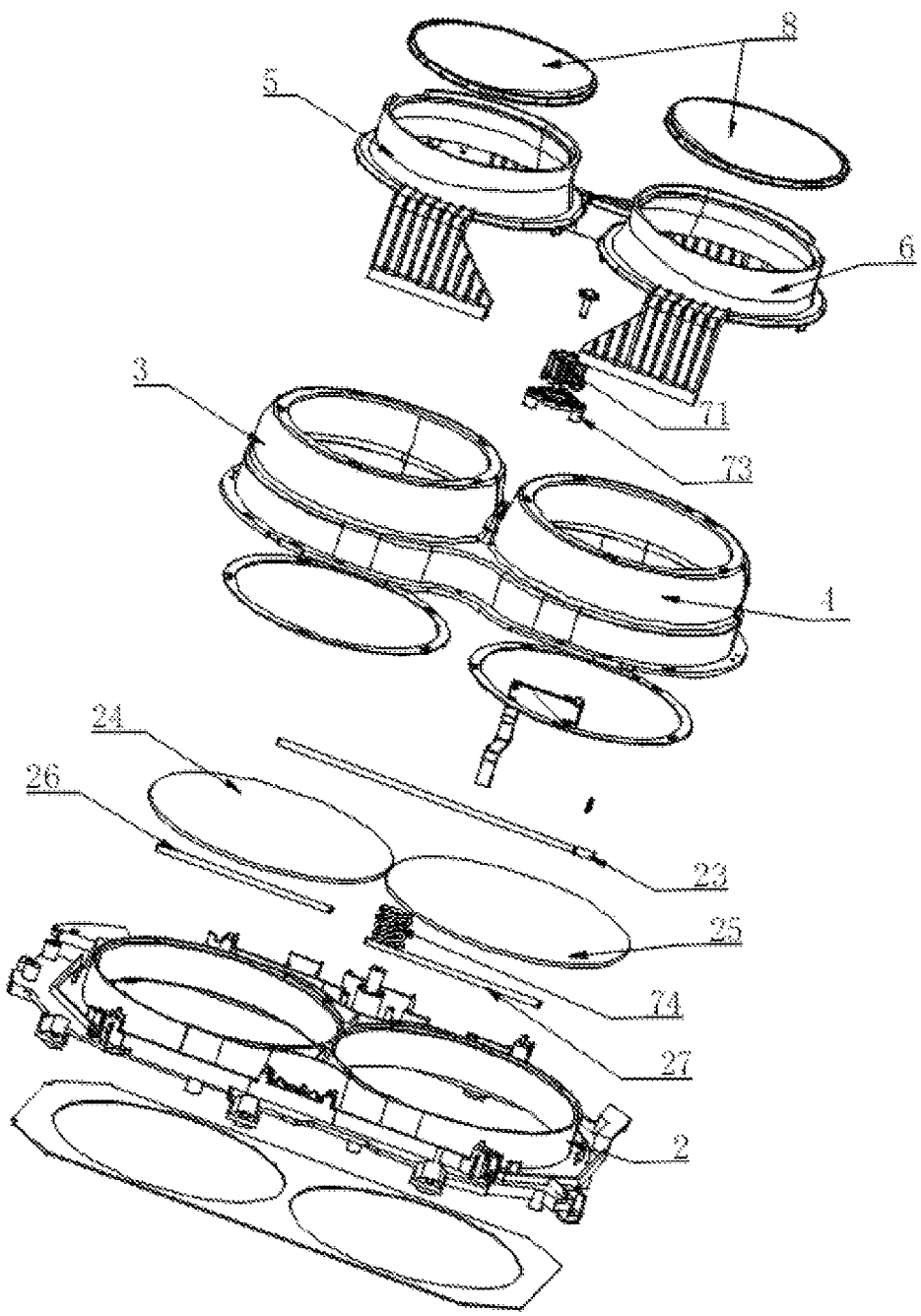
FIG. 1 is an exploded view of a VR glasses in an embodiment of the present disclosure.

1. Bottom plate; 11. Light-transmitting holes; 12. fixing posts; 2. Screen frame; 21. First side structure; 22. Second side structure; 23. First sliding rod; 24. First dust-proof sheet; 25. Second dust-proof sheet; 26. Second sliding rod; 27. Third sliding rod; 3. First sealing portion; 4. Second sealing portion; 5. First lens barrel; 51. First mounting portion; 52. Third mounting portion; 6. Second lens barrel; 7. Transmission mechanism; 71. First gear; 711. First mating surface; 72. fixing shaft; 73. Gear bracket; 731. second mating surface; 732. Through hole; 74. Spring; 75. First rack; 76. Second rack; 77. Face gear; 8. Lens; 9. Limit plate.

DETAILED DESCRIPTION OF THE EMBODIMENTS

Various exemplary embodiments of the present disclosure will now be described in detail with reference to the accompanying drawings. It should be noted that unless specifically stated otherwise, the relative arrangement, numerical expressions and numerical values of the components and steps set forth in these embodiments do not limit the scope of the present disclosure.

The following description of at least one exemplary embodiment is actually only illustrative, and is by no means as any limitation on the disclosure and its application or use.

The technologies, methods, and equipment known to those of ordinary skill in the relevant fields may not be discussed in detail, but where appropriate, the technologies, methods, and equipment should be regarded as part of the specification.

In all the examples shown and discussed herein, any specific value should be interpreted as merely exemplary, rather than as a limitation. Therefore, other examples of the exemplary embodiment may have different values.

It should be noted that similar reference numerals and letters indicate similar items in the following drawings, and therefore, once an item is defined in one drawing, it does not need to be further discussed in the subsequent drawings.

Figures 2, 3:
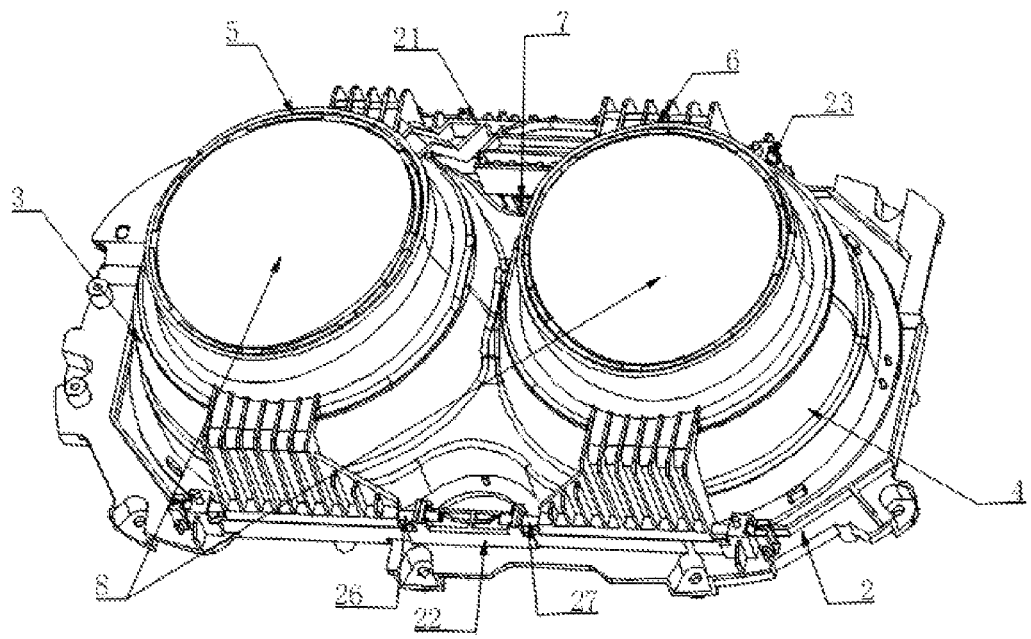
FIG. 2 is a first structural schematic diagram of the VR glasses in the embodiment of the present disclosure.
FIG. 3 is a second structural schematic diagram of the VR glasses in the embodiment of the present disclosure.
Figure 4:
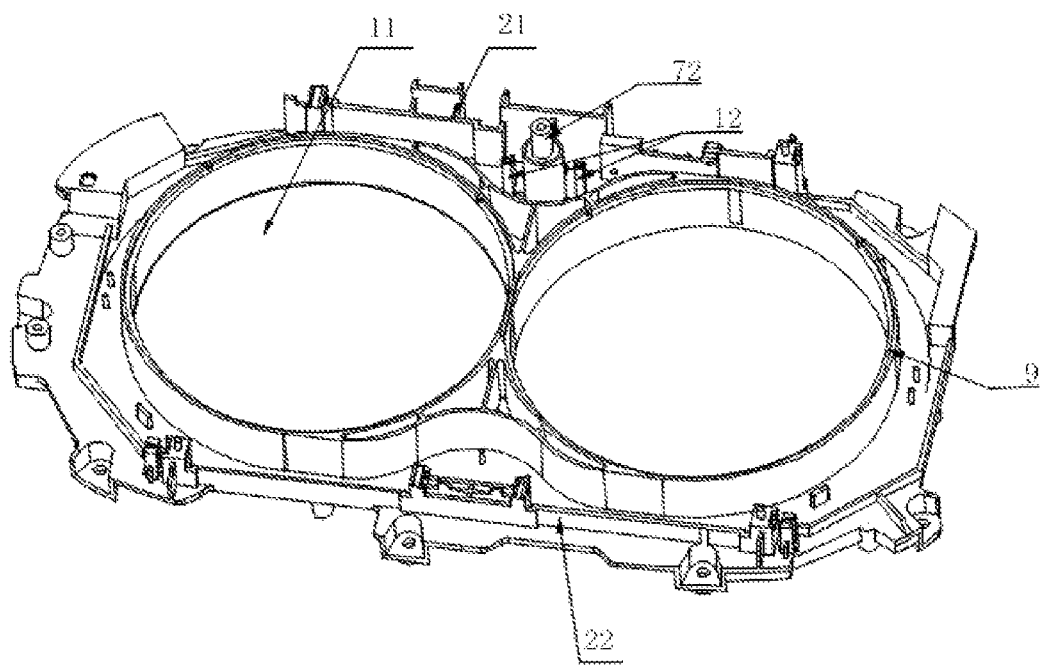
FIG. 4 is a third structural schematic diagram of the VR glasses in the embodiment of the present disclosure.
Figure 5:
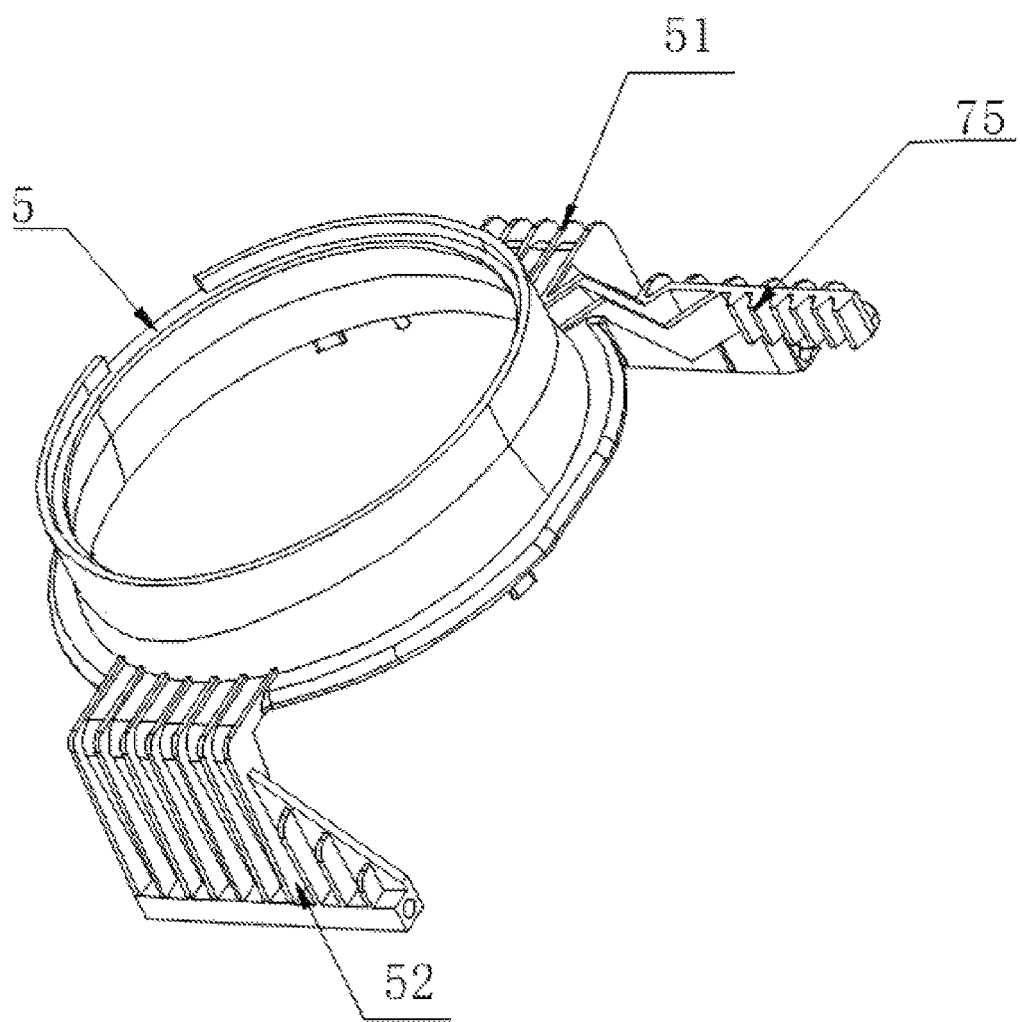
FIG. 5 is a structural schematic diagram of a first lens barrel in the embodiment of the present disclosure.
Figure 6:
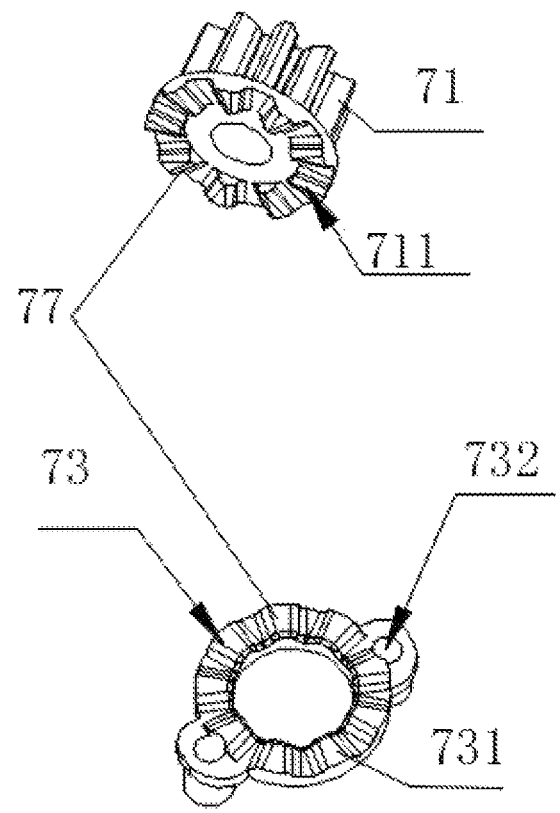
FIG. 6 is a structural schematic diagram of a part of a transmission mechanism (wherein the transmission mechanism includes a first gear, a face gear and a gear bracket) in the embodiment of the present disclosure.
Figure 7:
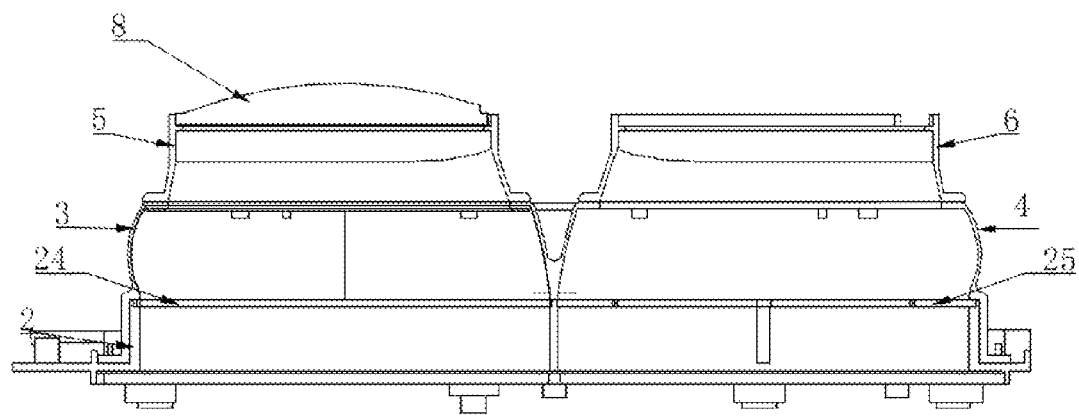
FIG. 7 is a cross-sectional view of the VR glasses in the embodiment of the present disclosure.
Figure 8:
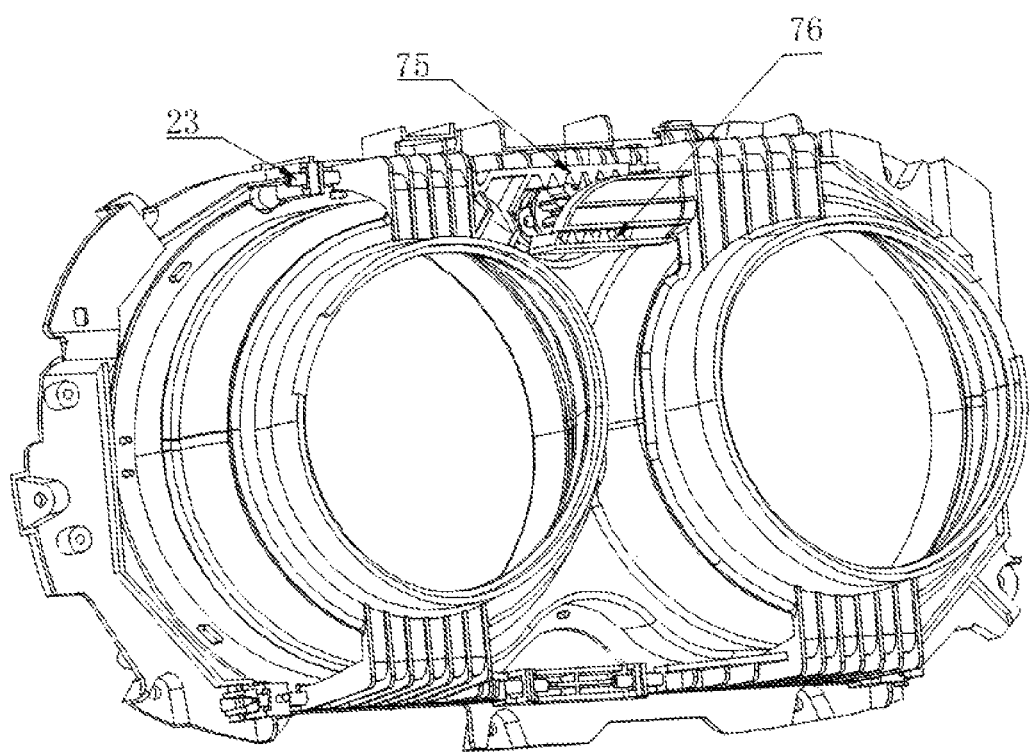
FIG. 8 is a fourth structural schematic diagram of the VR glasses in the embodiment of the present disclosure.

As shown in FIG. 1 to FIG. 8, the present disclosure proposes a VR glasses, includes: a bottom plate 1, a screen frame 2, a first sealing portion 3 and a second sealing portion 4. The screen frame 2 is fixed on the bottom plate 1, and the bottom plate 1 is provided with two light-transmitting holes 11 symmetrically, and an edge of the screen frame 2 has a first side structure 21 perpendicular to the bottom plate 1. The first sealing portion 3 and the second sealing portion 4 are both made of a silicone material and correspond to the positions of the two light-transmitting holes 11 respectively. The first sealing portion 3 and the second sealing portion 4 are both arranged on a same side as an extension direction of the first side structure 21. The silicone material receives very little friction during use, and the silicone material itself has higher abrasion resistance and is not easy to age. The use of silicone material as the material of the first sealing part 3 and the second sealing part 4 can more effectively seal the inside of the VR glasses, a problem that blurred imaging effects and a poor user experience due to dust or water stains entering the inside of the VR glasses is avoided.

In some embodiments, the VR glasses further includes a first lens barrel 5 and a second lens barrel 6, wherein the first lens barrel 5 communicates with one of the two light-transmitting holes 11 through the first sealing portion 3 and the second lens barrel 6 communicates with the other one of the two light-transmitting holes 11 through the second sealing portion 4, and each of the first lens barrel 5 and the second lens barrel 6 is provided with a lens 8. The two lenses 8 are respectively arranged on an end, away from the light transmission holes 11, of the first lens barrel 5 and the second lens barrel 6. When a user uses the VR glasses, the lenses 8 are used close to his/her eyes. The first lens barrel 5 and the second lens barrel 6 are both in communication with the light-transmitting holes 11, and the user can clearly view image through the first lens barrel 5 and the second lens barrel 6. However, the interpupillary distance of each user is different, so when different users use the VR glasses, a distance between the first lens barrel 5 and the second lens barrel 6 needs to be adjusted to achieve the best viewing effect. In a process of adjusting the distance between the first lens barrel 5 and the second lens barrel 6, as the distance between the first lens barrel 5 and the second lens barrel 6 decreases or increases, the first sealing portion 3 and the second sealing part 4 will be deformed, while the first sealing part 3 and the second sealing part 4 made of the silicone material have little friction during a deformation process, and the silicone material has the characteristics of wear resistance and corrosion resistance, which can avoid the erosion of impurities such as perspiration, water stains, dust during daily use and can effectively seal the space between the first lens barrel 5 and the bottom plate 1, as well as the space between the second lens barrel 6 and the bottom plate 1 for a long time, ensuring that the imaging effect of the VR glasses is clear and a service life of the VR glasses is prolonged.

In some embodiments, the VR glasses further includes a transmission mechanism 7, wherein the transmission mechanism 7 is a stepped adjustment mechanism, the transmission mechanism 7 is arranged close to the first side structure 21 of the screen frame 2, the first lens barrel 5 and the second lens barrel 6 is configured to move toward each other through the transmission mechanism 7. The transmission mechanism 7 of the stepped adjustment mode makes an adjustment process have a sense of frustration, which is equivalent to setting different gears in the process of adjusting the distance between the first lens barrel 5 and the second lens barrel 6. When the user pushes the first lens barrel 5 or the second lens barrel 6, the stepped adjustment mode of the transmission mechanism 7 can make the process of adjusting the first lens barrel 5 and the second lens barrel 6 easier for the user. The transmission mechanism 7 enables that after the user selects the interpupillary distance, the distance between the first lens barrel 5 and the second lens barrel 6 is relatively fixed and would not be changed even if the first lens barrel 5 or the second lens barrel 6 is accidentally touched, which improves the user experience.

In some embodiments, the transmission mechanism 7 includes a first gear 71, a fixing shaft 72, a gear bracket 73, and a spring 74. The fixing shaft 72 is vertically fixed on the bottom plate 1, and the spring 74 is in a compressed state and sleeved on the fixing shaft 72, and the gear bracket 73 is fixedly arranged on the fixing shaft 72 in a horizontal direction. The first gear 71 is rotatably arranged on the fixing shaft 72, and a side of the first gear 71 facing the gear bracket 73 is a first mating surface 711. On a side of the gear bracket 73 facing the first gear 71 is a second mating surface 731. The first mating surface 711 and the second mating surface 731 are pressed against each other by the spring 74, and there are matching face gears 77 on the first mating surface 711 and the second mating surface 731. The spring 74 makes the first mating surface 711 always pressed against the second mating surface 731. When the first gear 71 rotates, the first mating surface 711 rotates, and the face gears 77 on the first mating surface 711 and the second mating surface 731 are misaligned. In some embodiments, the face gear 77 on the first mating surface 711 has a first flange, and the face gear 77 on the second mating surface 731 has a first groove, a second groove, and a second flange. In an initial state, the first flange is in the first groove. When the first gear 71 rotates, the first flange rotates with the first gear 71, and moves from the first groove to the second groove. At this time, the spring 74 is continuously compressed to make the position of the second flange lower, so that the first flange can bypass the second flange and enter into the second groove, and thus the adjustment of one gear distance is completed. In order to prevent the first gear 71 from moving in a vertical direction, the fixing shaft 72 can be arranged to a structure with a diameter of the upper half smaller than that of the lower half, and the first gear 71 is clamped through connecting surfaces of the upper and lower parts; meanwhile, the gear bracket 73 is provided with a through hole 732 with a larger size in a middle part of the gear bracket, so that it is convenient for the gear bracket 73 to be sleeved on the lower half of the fixing shaft 72.

In some embodiments, a first rack 75 is provided on a side of the first lens barrel 5 close to the first side structure 21, while a second rack 76 is provided on a side of the second lens barrel 6 close to the first side structure 21. The first gear 71 is arranged between the first rack 75 and the second rack 76. When the first gear 71 is in a rotating state, the two face gears 77 on the first mating surface 711 and the second mating surface 731 mesh with each other. The first rack 75 and the second rack 76 are configured to be able to drive the first lens barrel 5 and the second lens barrel 6 to approach or move away from each other. The first rack 75 opposites to the second rack 76, and the first rack 75 and the second rack 76 are respectively mesh with the first gear 71. When it is need to adjust the distance between the first lens barrel 5 and the second lens barrel 6, by toggling the first lens barrel 5 or the second lens barrel 6, the first gear 71 is driven to rotate by the first rack 75 or the second rack 76, so as to realize the adjustment of the distance between the first lens barrel 5 and the second lens barrel 6. For example, when the distance between the first lens barrel 5 and the second lens barrel 6 needs to be increased, it is only necessary to toggle the first lens barrel 5 toward a direction away from the second lens barrel 6, and then the first rack 75 drives the first gear 71 to rotate, and the second rack 76 is driven to move toward a direction away from the first lens barrel 5, so that the second lens barrel 6 moves toward the direction away from the first lens barrel 5, thereby speeding up an adjustment speed. At this time, the interaction among the spring 74, the first mating surface 711 and the second mating surface 731 realizes the stepped adjustment, so that the customer can clearly feel the existence of each gear. Therefore, the user is able to adjust the distance between the first lens barrel 5 and the second lens barrel 6 more conveniently.

Wherein, the first gear 71 would not be displaced in the vertical direction, and only the first rack 75 and/or the second rack 76 drive the first gear 71 to rotate in the horizontal direction. The gear bracket 73 would not rotate in the horizontal direction, but would realize the change of its position in the vertical direction by compressing the spring 74.

In some embodiments, a first sliding rod 23 is provided on the first side structure 21, and the first lens barrel 5 and the second lens barrel 6 are slidably arranged on the first sliding rod 23. Through the sliding rod 23, the first lens barrel 5 and the second lens barrel 6 always is kept in a horizontal state during the distance adjustment process, and there will be no deviation or tilt. The stability of the VR glasses during use is ensured, and the visual imaging effect of the VR glasses is improved.

In some embodiments, the first lens barrel 5 is provided with a first mounting portion 51 on a side facing the first side structure 21, and the first rack 75 is arranged on the first mounting portion 51. The second lens barrel 6 is provided with a second mounting portion on a side facing the first side structure 21, and the second rack 76 is arranged on the second mounting portion. The first mounting portion 51 and the second mounting portion both extend horizontally to the first side structure 21 and then bend toward a direction of the bottom plate 1. The first sliding rod 23 penetrates ends of the first mounting portion 51 and the second mounting portion close to the bottom plate 1. The user can adjust the distance between the first lens barrel 5 and the second lens barrel 6 by pushing the first mounting portion 51 or the second mounting portion, while the first sliding rod 23 serves as an auxiliary stabilization structure when adjusting the positions of the first lens barrel 5 and the second lens barrel 6, so that the distance between the first lens barrel 5 and the second lens barrel 6 during the stepped adjustment process, the first lens barrel 5 and the second lens barrel 6 are always move parallel to the first side structure 21.

In some embodiments, a side of the screen frame 2 opposite to the first side structure 21 is a second side structure 22. The first lens barrel 5 is provided with a third mounting portion 52 on a side of the first lens barrel facing the second side structure 22, while the second lens barrel 6 is provided with a fourth mounting portion on a side of the second lens barrel facing the second side structure 22. The third mounting portion 52 and the fourth mounting portion both extend horizontally to the second side structure 22 and then bend toward a direction of the bottom plate 1. A second sliding rod 26 is fixed on a position, corresponding to the third mounting portion 52, of the second side structure 22, and the second sliding rod 26 penetrates a bottom of the third mounting portion 52. A third sliding rod 27 is fixed on a position, corresponding to the fourth mounting portion, of the second side 22, and the third sliding rod 27 penetrates a bottom of the fourth mounting portion. The third mounting portion 52 cooperates with the first mounting portion 51, and the fourth mounting portion cooperates with the second mounting portion, thereby further facilitating the user to push the first lens barrel 5 and the second lens barrel 6. At the same time, a gap is provided between the second sliding rod 26 and the third sliding rod 27, and the second sliding rod 26 and the third sliding rod 27 is configured to assist in the stabilization of positions of the first lens barrel 5 and the second lens barrel 6 during the stepped adjustment process, so as to avoid a problem that a decrease in the user experience caused by changes in the distance between the first lens barrel 5 and the first side structure 21, as well as the distance between the second lens barrel 6 and the first side structure 21 is avoided.

Wherein, in some embodiments, the first mounting portion 51, the second mounting portion, the third mounting portion 52, and the fourth mounting portion are provided with reinforcing ribs, and the reinforcing ribs extend from the barrels of the first lens barrel 5 and the second lens barrel 6 toward the bottom plate 1. The reinforcing ribs strengthen the overall structural strength of the VR glasses. At the same time, during the process of adjusting the distance between the first lens barrel 5 and the second lens barrel 6, the reinforcing ribs plays a non-slip role, which is convenient for the user to push the first lens barrel 5 or the second lens barrel 6.

In some embodiments, each of middle parts of the first sealing portion 3 and the second sealing portion 4 protrudes away from a peripheral side in a shape of a lantern. When the distance between the first lens barrel 5 and the second lens barrel 6 is changed, the first sealing portion 3 and the second sealing portion 4 are both deformed. The lantern-shaped protruding structure increases a deformation margin of the first sealing portion 3 and the second sealing portion 4, so as to increase the adjustable distance between the first lens barrel 5 and the second lens barrel 6 to adapt to different interpupillary distances among different users. At the same time, the lantern-shaped structure can also increase the number of deformations of the first sealing portion 3 and the second sealing portion 4, thus prolonging an use time of the first sealing portion 3 and the second sealing portion 4, that is, further increasing a service life of the VR glasses.

In some embodiments, a first dust-proof sheet 24 is provided on the screen frame 2 at a position corresponding to the first sealing portion 3, and a second dust-proof sheet 25 is provided on the screen frame 2 at a position corresponding to the second sealing portion 4. If a screen is provided on a side of the screen frame 2 away from the lens 8, when the dust enters inside the VR glasses through a connection between the screen frame 2 and the screen, the first dust-proof sheet 24 and the second dust-proof sheet 25 is able to absorb the dust. There are gaps between the first dust-proof sheet 24 and the screen, as well as between the second dust-proof sheet 25 and the screen. When the user uses the VR glasses, the user focuses on the screen. At this time, the dust on the first dust-proof sheet 24 and the second dust-proof sheet 25 is blurred, which improves the overall visual effect of the VR glasses and improves the user experience.

In some embodiments, a limit plate 9 is provided perpendicular to the bottom plate 1 and around a peripheral side of the light-transmitting holes 11. The first dust-proof sheet 24 and the second dust-proof sheet 25 are arranged on the limit plate 9, and the portions of the limit plate 9 between the first lens barrel 5 and the second lens barrel 6 are close to each other. The limit plate 9 is used to limit the first dust-proof sheet 24 and the second dust-proof sheet 25.

In some embodiments, a first mounting plate is formed by extending a side of the first lens barrel 5 being connected to the first sealing portion 3, to a peripheral side. The first sealing portion 3 is provided with a first mounting groove, and the first mounting plate is embedded in the first mounting groove. The first mounting plate cooperates with the first mounting groove to increase the strength of the connection between the first sealing portion 3 and the first lens barrel 5, and during the movement of the first lens barrel 5, the separation of the first lens barrel 5 from the first sealing portion 3 is avoided; meanwhile, a sealing effect of the first sealing portion 3 on the inside of the first lens barrel 5 is further improved.

In some embodiments, a second mounting plate is formed by extending a side of the second lens barrel 6 being connected to the second sealing portion 4, to the peripheral side, and the second sealing portion 4 is provided with a second mounting groove, and the second mounting plate is embedded in the second mounting groove. The second mounting plate cooperates with the second mounting groove to increase the strength of the connection between the second sealing portion 4 and the second lens barrel 6, and during the movement of the second lens barrel 6, the separation of the second lens barrel 6 from the second sealing portion 4 is avoided; meanwhile, the sealing effect of the second sealing portion 4 on the inside of the second lens barrel 6 is further improved.

In some embodiments, two fixing posts 12 are provided on the bottom plate 1. The two fixing posts 12 are respectively provided on both sides of the fixing shaft 72. Both ends of the gear bracket 73 are provided with through holes 732, and the fixing posts 12 penetrate into the through holes 732. The gear bracket 73 is horizontally limited by the cooperation of the two fixing posts 12 and the two through holes 732. During the process of compressing the spring 74 by the gear bracket 73, the gear bracket 73 and the first gear 71 would not trip, so that the first mating surface 711 can keep meshing with the second mating surface 731.

In some embodiments, a broken portion is provided on the second side 22, and the broken portion corresponds to a center line of the first lens barrel 5 and the second lens barrel 6. During the process of using the VR glasses by the user, a correct way to wear the VR glasses is that the first side structure 21 is close to the forehead, the second side structure 22 is close to the nose, and the broken portion on the second side structure 22 prevents the second side structure 22 from compressing the wing of the nose, thereby improving the user experience.

Although some specific embodiments of the present disclosure have been described in detail through examples, those skilled in the art should understand that the above examples are only for illustration and not for limiting the scope of the present disclosure. Those skilled in the art should understand that the above embodiments can be modified without departing from the scope and spirit of the disclosure. The scope of the present disclosure is defined by the appended claims.

What is claimed is:

1. A VR glasses, comprising:
   a screen frame and a bottom plate, wherein the screen frame is fixed on the bottom plate, the bottom plate is provided with two light-transmitting holes symmetrically, and an edge of the screen frame has a first side structure perpendicular to the bottom plate;
   a first sealing portion and a second sealing portion, wherein the first sealing portion and the second sealing portion are corresponding to the two light-transmitting holes respectively, the first sealing portion and the second sealing portion are both arranged on a same side as an extension direction of the first side;
   a first lens barrel and a second lens barrel, wherein the first lens barrel communicates with one of the two light-transmitting holes through the first sealing portion and the second lens barrel communicates with the other one of the two light-transmitting holes through the second sealing portion, and each of the first lens barrel and the second lens barrel is provided with a lens;
   a transmission mechanism, wherein the transmission mechanism is arranged close to the first side structure of the screen frame, the first lens barrel and the second lens barrel are configured to move relative to each other through the transmission mechanism, the transmission mechanism includes a first gear, a gear bracket and a spring, and on a side of the first gear facing the gear bracket is a first mating surface, and on a side of the gear bracket facing the first gear is a second mating surface, the first mating surface and the second mating surface are pressed against each other by the spring.

2. The VR glasses as claimed in claim 1, wherein the transmission mechanism includes a fixing shaft, wherein the fixing shaft is vertically fixed on the bottom plate, and the spring is in a compressed state and sleeved on the fixing shaft, the gear bracket is fixedly arranged on the fixing shaft in a horizontal direction, the first gear is rotatably arranged on the fixing shaft, and there are matching face gears on the first mating surface and the second mating surface; the spring makes the first mating surface always pressed against the second mating surface, when the first gear rotates, the first mating surface rotates, and the face gears on the first mating surface and the second mating surface are misaligned.

3. The VR glasses as claimed in claim 2, wherein a first rack is provided on a side, close to the first side, of the first lens barrel, a second rack is provided on a side, close to the first side, of the second lens barrel, and the first gear is arranged between the first rack and the second rack; the two face gears on the first mating surface and the second mating surface mesh with each other; the first rack and the second rack are configured to be able to drive the first lens barrel and the second lens barrel to approach or move away from each other.

4. The VR glasses as claimed in claim 3, wherein the VR glasses comprises a first sliding rod provided on the first side, and the first lens barrel and the second lens barrel are slidably arranged on the first sliding rod.

5. The VR glasses as claimed in claim 4, wherein a first mounting portion is provided on a side of the first lens barrel facing the first side, and the first rack is arranged on the first mounting portion, a second mounting portion is provided on a side of the second lens barrel facing the first side, the second rack is arranged on the second mounting portion, the first mounting portion and the second mounting portion both extend horizontally to the first side structure and then bend toward a direction of the bottom plate, and the first sliding rod penetrates ends of the first mounting portion and the second mounting portion close to the bottom plate.

6. The VR glasses as claimed in claim 1, wherein a side of the screen bracket opposite to the first side structure is a second side structure, a third mounting portion is disposed on a side of the first lens barrel facing the second side, a fourth mounting portion is disposed on a side of the second lens barrel facing the second side, the third mounting portion and the fourth mounting portion both extend horizontally to the second side and then bend toward a direction of the bottom plate, a second sliding rod is fixed on the second side structure at a position corresponding to the third mounting portion, the second sliding rod penetrates a bottom of the third mounting portion, a third sliding rod is fixed on the second side at a position corresponding to the fourth mounting portion, and the third sliding rod penetrates a bottom of the fourth mounting portion.

7. The VR glasses as claimed in claim 1, wherein each of middle parts of the first sealing portion and the second sealing portion protrudes away from a peripheral side; when a distance between the lens barrel and the second lens barrel is changed, the first sealing portion and the second sealing portion are both deformed.

8. The VR glasses as claimed in claim 1, wherein a first dust-proof sheet is provided on a position, corresponding to the first sealing portion, of the screen bracket; and a second dust-proof sheet is provided on a position, corresponding to the second sealing portion, of the screen bracket.

9. The VR glasses as claimed in claim 1, wherein
   a first mounting plate is formed by extending a side of the first lens barrel being connected with the first sealing portion to a peripheral side; the first sealing portion is provided with a first mounting groove, and the first mounting plate is embedded in the first mounting groove;

a second mounting plate is formed by extending a side of the second lens barrel being connected with the second sealing portion to the peripheral side; the second sealing portion is provided with a second mounting groove, and the second mounting plate is embedded in the second mounting groove.

10. The VR glasses as claimed in claim 2, wherein two fixing posts are provided on the bottom plate, the two fixing posts are respectively arranged on two sides of the fixing shaft, both ends of the gear bracket are provided with through holes, and the two fixing posts penetrates into the through holes.

11. The VR glasses as claimed in claim 6, wherein a broken portion is provided on the second side, and the broken portion corresponds to a center line of the first lens barrel and the second lens barrel.

12. The VR glasses as claimed in claim 8, wherein a limit plate is provided perpendicular to the bottom plate and around a peripheral side of the two light-transmitting holes, the first dust-proof sheet and the second dust-proof sheet are arranged on the limit plate, portions of the limit plate between the first lens barrel and the second lens barrel are close to each other.

13. The VR glasses as claimed in claim 2, wherein the face gear on the first mating surface has a first flange, and the face gear on the second mating surface has a first groove, a second groove, and a second flange, in an initial state, the first flange is in the first groove, when the first gear rotates, the first flange rotates with the first gear, and moves from the first groove to the second groove.

14. The VR glasses as claimed in claim 4, wherein the first mounting portion and the second mounting portion are provided with reinforcing ribs, and the reinforcing ribs extend from the barrels of the first lens barrel and the second lens barrel toward the bottom plate.

15. The VR glasses as claimed in claim 1, wherein the first sealing portion and the second sealing portion are both made of a silicone material.

* * * * *